(12) United States Patent
Tasaka et al.

(10) Patent No.: US 10,468,071 B1
(45) Date of Patent: Nov. 5, 2019

(54) MAGNETIC STORAGE DEVICE WITH HEAT-ASSISTED MAGNETIC STORAGE HEAD AND ASSOCIATED METHOD OF MANUFACTURE

(71) Applicant: Western Digital Technologies, Inc., Irvine, CA (US)

(72) Inventors: Kenji Tasaka, Yokohama (JP); Yuichiro Sano, Sagamihara (JP); Ehsan Rismaniyazdi, San Jose, CA (US); Barry Stipe, San Jose, CA (US); Nobuyuki Okunaga, Odawara (JP); Erhard Schreck, San Jose, CA (US); Oscar Ruiz, San Jose, CA (US); Qing Dai, San Jose, CA (US); Sripathi V. Canchi, Sunnyvale, CA (US); Weidong Huang, Palo Alto, CA (US); Yong Hu, San Ramon, CA (US); Kenji Kuroki, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/996,092

(22) Filed: Jun. 1, 2018

(51) Int. Cl.
*G11B 33/14* (2006.01)
*G11B 5/00* (2006.01)

(52) U.S. Cl.
CPC .......... *G11B 33/14* (2013.01); *G11B 33/1466* (2013.01); *G11B 33/1486* (2013.01); *G11B 2005/0021* (2013.01)

(58) Field of Classification Search
None
See application file for complete search history.

(56) References Cited

U.S. PATENT DOCUMENTS 3,569,637 A * 3/1971 Esten .................. G11B 15/62
242/324
5,293,286 A * 3/1994 Hasegawa .......... G11B 33/1453
360/99.16
(Continued)

FOREIGN PATENT DOCUMENTS

CN 106340316 1/2017
EP 0211099 A1 * 2/1987 ............. G11B 19/20
(Continued)

OTHER PUBLICATIONS

Granger-Brown, Helium: Gas Filling and Extraction during the HDD Manufacturing Process, Xyratex, uploaded on Apr. 8, 2016, pp. 1-10, https://www.researchgate.net/publication/268001666_Helium_Gas_Filling_and_Extraction_during_the_HDD_Manufacturing_Process.
(Continued)

*Primary Examiner* — William J Klimowicz
(74) *Attorney, Agent, or Firm* — Kunzler Bean & Adamson

(57) ABSTRACT

Disclosed herein is a magnetic storage device that comprises a housing defining an interior cavity. The magnetic storage device also comprises at least one magnetic disk in the interior cavity of the housing. The magnetic storage device further comprises at least one read-write head in the interior cavity and configured to read data from and write data to the magnetic disk. The read-write head comprises a heat-assisted magnetic storage (HAMR) head. The magnetic storage device additionally comprises a gas, comprising oxygen and helium, sealed in the interior cavity of the housing. A percent concentration of oxygen in the gas is greater than or equal to 3%. A pressure of the gas is between 10% and 70%, inclusive, of atmospheric pressure. A relative humidity within the interior cavity is less than 5%, inclusive. A
(Continued)

percent concentration of helium in the gas is less than or equal to 90%.

17 Claims, 4 Drawing Sheets

(56) References Cited

U.S. PATENT DOCUMENTS

| | | | | |
|---|---|---|---|---|
| 5,392,177 | A * | 2/1995 | Chainer | G11B 23/507 |
| | | | | 360/99.18 |
| 6,000,121 | A * | 12/1999 | Kuroki | G11B 33/1453 |
| | | | | 29/603.03 |
| 6,144,178 | A * | 11/2000 | Hirano | G11B 33/1486 |
| | | | | 318/476 |
| 6,762,909 | B2 | 7/2004 | Albrecht et al. | |
| 7,298,571 | B1 | 11/2007 | Schmidt et al. | |
| 7,333,283 | B2 | 2/2008 | Akamatsu et al. | |
| 8,094,409 | B2 | 1/2012 | Feliss et al. | |
| 8,665,555 | B1 * | 3/2014 | Young | G11B 33/1486 |
| | | | | 360/97.18 |
| 8,854,766 | B1 * | 10/2014 | Gustafson | G11B 33/1486 |
| | | | | 360/97.12 |
| 8,885,287 | B1 * | 11/2014 | Koike | G11B 33/1446 |
| | | | | 360/97.12 |
| 9,025,284 | B1 * | 5/2015 | Sill | G11B 25/043 |
| | | | | 360/265.7 |
| 9,036,307 | B1 | 5/2015 | Hoshiya et al. | |
| 9,058,851 | B1 * | 6/2015 | Hanke | G11B 33/1486 |
| 9,601,140 | B1 * | 3/2017 | Rajauria | G11B 5/40 |
| 2004/0021980 | A1 * | 2/2004 | Albrecht | G11B 5/6005 |
| | | | | 360/99.21 |
| 2006/0164752 | A1 * | 7/2006 | Tanaka | G11B 5/59627 |
| | | | | 360/97.11 |
| 2006/0171065 | A1 | 8/2006 | Akamatsu et al. | |
| 2009/0188386 | A1 | 7/2009 | Beatty et al. | |
| 2016/0336045 | A1 * | 11/2016 | Beatty | B65D 81/266 |
| 2017/0101202 | A1 * | 4/2017 | Fitzgerald | G11B 33/027 |
| 2017/0221511 | A1 | 8/2017 | Dai et al. | |

FOREIGN PATENT DOCUMENTS

| | | | | | |
|---|---|---|---|---|---|
| JP | 52038908 | A | * | 3/1977 | G11B 23/021 |
| JP | 61115291 | A | * | 6/1986 | |
| JP | 61292289 | A | * | 12/1986 | |
| JP | 62006479 | | | 1/1987 | |
| JP | 01057480 | A | * | 3/1989 | |
| JP | 2000331458 | A | * | 11/2000 | |

OTHER PUBLICATIONS

Smolaks, Seagate launches its first helium-filled hard drive, Datacenter Dynamics, Jan. 18, 2016, pp. 1-2, http://www.datacenterdynamics.com/content-tracks/servers-storage/seagate-launches-its-first-helium-filled-hard-drive/95543.fullarticle.

* cited by examiner

MAGNETIC STORAGE DEVICE WITH HEAT-ASSISTED MAGNETIC STORAGE HEAD AND ASSOCIATED METHOD OF MANUFACTURE

FIELD

This disclosure relates generally to magnetic storage devices, and more particularly to improving the operational lifetime of heat-assisted magnetic storage heads of magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Some write heads, such as heat-assisted magnetic storage heads, include near-field transducers that temporarily heat a region of magnetic storage media while writing data to the region. The use of near-field transducers can increase the data storage capacity of the magnetic storage media. However, operating near-field transducers for extended operational lifetimes, without degrading the performance of the magnetic storage device, can be difficult.

SUMMARY

A need exists for a magnetic storage device and a method of manufacture that prolongs the operational lifetime of a heat-assisted magnetic storage head without degrading the performance of the magnetic storage device. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a magnetic storage device that comprises a housing defining an interior cavity. The magnetic storage device also comprises at least one magnetic disk in the interior cavity of the housing. The magnetic storage device further comprises at least one read-write head in the interior cavity and configured to read data from and write data to the magnetic disk. The magnetic storage device additionally comprises a gas, comprising oxygen, sealed in the interior cavity of the housing. A percent concentration of oxygen in the gas is greater than or equal to 10%. A pressure of the gas is between 10% and 70%, inclusive, of atmospheric pressure. The preceding subject matter of this paragraph characterizes example 1 of the present disclosure.

The percent concentration of oxygen in the gas is between 20% and 30%, inclusive. The preceding subject matter of this paragraph characterizes example 2 of the present disclosure, wherein example 2 also includes the subject matter according to example 1, above.

The percent concentration of oxygen in the gas is greater than 20%. The preceding subject matter of this paragraph characterizes example 3 of the present disclosure, wherein example 3 also includes the subject matter according to example 2, above.

The pressure of the gas is between 20% and 40%, inclusive, of atmospheric pressure. The preceding subject matter of this paragraph characterizes example 4 of the present disclosure, wherein example 4 also includes the subject matter according to any one of examples 2-3, above.

The read-write head comprises a heat-assisted magnetic storage (HAMR) head. The preceding subject matter of this paragraph characterizes example 5 of the present disclosure, wherein example 5 also includes the subject matter according to any one of examples 1-4, above.

The gas consists of oxygen and helium. A percent concentration of helium in the gas is less than or equal to 90%. The preceding subject matter of this paragraph characterizes example 6 of the present disclosure, wherein example 6 also includes the subject matter according to any one of examples 1-5, above.

The percent concentration of oxygen in the gas is between 20% and 30%, inclusive. The percent concentration of helium in the gas is between 70% and 80%. The preceding subject matter of this paragraph characterizes example 7 of the present disclosure, wherein example 7 also includes the subject matter according to example 6, above.

A relative humidity within the interior cavity is less than 5%, inclusive. The preceding subject matter of this paragraph characterizes example 8 of the present disclosure, wherein example 8 also includes the subject matter according to any one of examples 1-7, above.

The relative humidity within the interior cavity is less than 1%, inclusive. The preceding subject matter of this paragraph characterizes example 9 of the present disclosure, wherein example 9 also includes the subject matter according to example 8, above.

Further disclosed herein is a magnetic storage device that comprises a housing defining an interior cavity. The magnetic storage device also comprises at least one magnetic disk in the interior cavity of the housing. The magnetic storage device further comprises at least one read-write head in the interior cavity and configured to read data from and write data to the magnetic disk. The magnetic storage device additionally comprises a gas, comprising oxygen, sealed in the interior cavity of the housing. A percent concentration of oxygen in the gas is greater than or equal to 3%. A relative humidity within the interior cavity is less than 5%, inclusive. The preceding subject matter of this paragraph characterizes example 10 of the present disclosure.

The relative humidity within the interior cavity is less than 1%, inclusive. The preceding subject matter of this paragraph characterizes example 11 of the present disclosure, wherein example 11 also includes the subject matter according to example 10, above.

The percent concentration of oxygen in the gas is greater than 10%, inclusive. The preceding subject matter of this paragraph characterizes example 12 of the present disclosure, wherein example 12 also includes the subject matter according to any one of examples 10-11, above.

The percent concentration of oxygen in the gas is between 20% and 30%, inclusive. The preceding subject matter of this paragraph characterizes example 13 of the present disclosure, wherein example 13 also includes the subject matter according to example 12, above.

The read-write head comprises a heat-assisted magnetic storage (HAMR) head. The preceding subject matter of this paragraph characterizes example 14 of the present disclosure, wherein example 14 also includes the subject matter according to any one of examples 10-13, above.

The gas consists of helium and oxygen. A percent concentration of helium in the gas is less than or equal to 90%.

The preceding subject matter of this paragraph characterizes example 15 of the present disclosure, wherein example 15 also includes the subject matter according to any one of examples 10-14, above.

A relative humidity within the interior cavity is less than 5%, inclusive. The preceding subject matter of this paragraph characterizes example 16 of the present disclosure, wherein example 16 also includes the subject matter according to example 15, above.

Additionally disclosed herein is a magnetic storage device that comprises a housing defining an interior cavity. The magnetic storage device also comprises at least one magnetic disk in the interior cavity of the housing. The magnetic storage device further comprises at least one read-write head in the interior cavity and configured to read data from and write data to the magnetic disk. The read-write head comprises a heat-assisted magnetic storage (HAMR) head. The magnetic storage device additionally comprises a gas, comprising oxygen and helium, sealed in the interior cavity of the housing. A percent concentration of oxygen in the gas is greater than or equal to 3%. A pressure of the gas is between 10% and 70%, inclusive, of atmospheric pressure. A relative humidity within the interior cavity is less than 5%, inclusive. A percent concentration of helium in the gas is less than or equal to 90%. The preceding subject matter of this paragraph characterizes example 17 of the present disclosure.

The percent concentration of oxygen in the gas is between 20% and 30%, inclusive. The pressure of the gas is between 20% and 40%, inclusive, of atmospheric pressure. The percent concentration of helium in the gas is between 70% and 80%, inclusive. The relative humidity within the interior cavity is less than 1%, inclusive. The preceding subject matter of this paragraph characterizes example 18 of the present disclosure, wherein example 18 also includes the subject matter according to example 17, above.

The percent concentration of oxygen in the gas is greater than 20%. The preceding subject matter of this paragraph characterizes example 19 of the present disclosure, wherein example 19 also includes the subject matter according to example 18, above.

Also disclosed herein is a method of making a magnetic storage device. The method comprises installing at least one magnetic disk and at least one heat-assisted magnetic storage (HAMR) head in an interior cavity of a housing of the magnetic storage device. The method also comprises filling the interior cavity of the housing with a gas, consisting of oxygen and helium, wherein a percent concentration of oxygen in the gas is greater than or equal to 3% and a percent concentration of helium in the gas is less than or equal to 90%. The method further comprises removing moisture from the interior cavity of the housing to decrease a relative humidity within the interior cavity of the housing to less than 5%, inclusive. The method additionally comprises reducing a pressure of the gas in the interior cavity to between 10% and 70%, inclusive, of atmospheric pressure. The method also comprises after filling the interior cavity of the housing with the gas, removing moisture from the interior cavity of the housing, and reducing the pressure of the gas, hermetically sealing the interior cavity of the housing. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
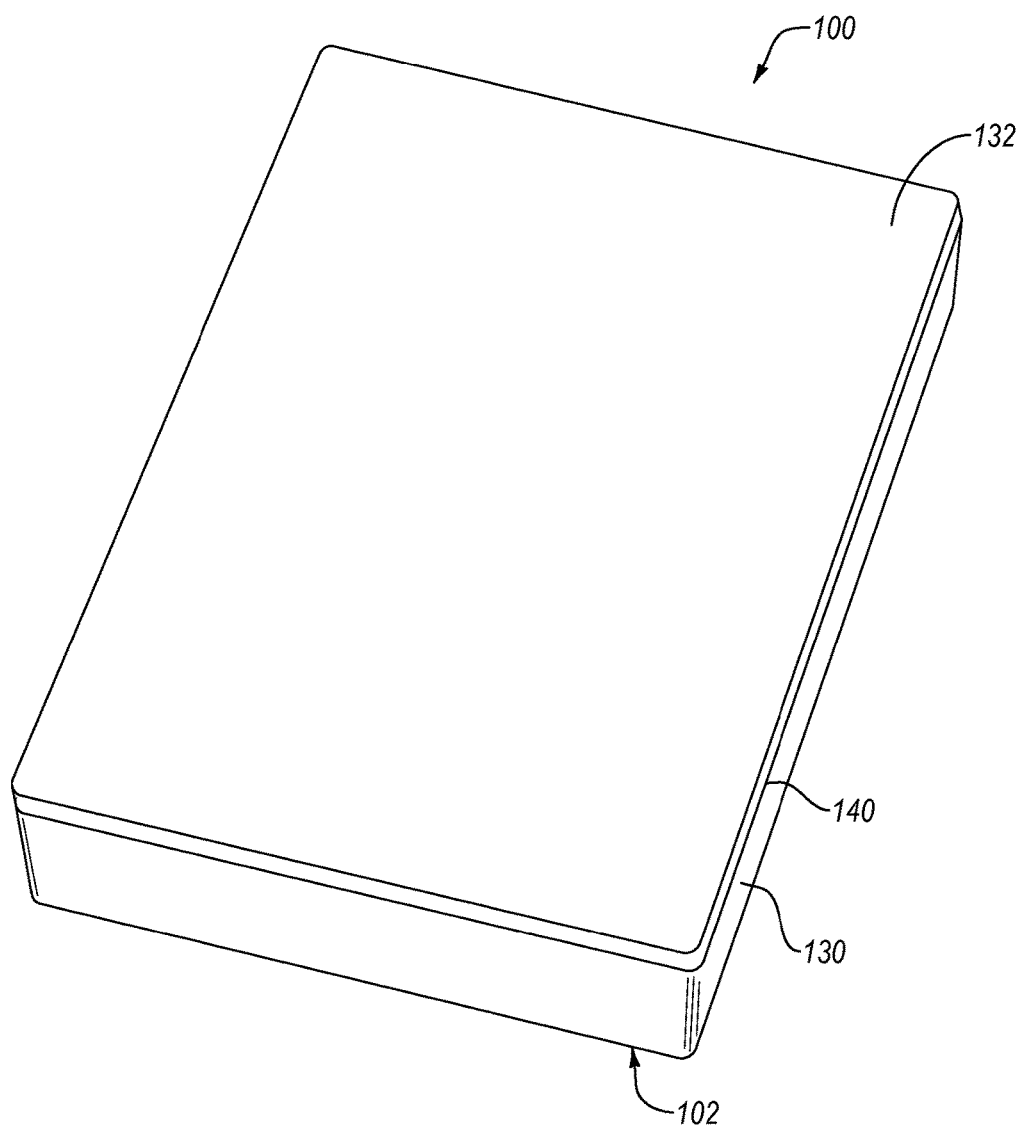
FIG. 1 is a perspective view of a magnetic storage device, according to one or more examples of the present disclosure.

Referring to FIG. 1, a magnetic storage device 100 (e.g., magnetic recording device), according to one embodiment, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 defined within the housing (see, e.g., FIG. 2). The housing 102 includes a base 130 and a cover 132 (shown in dashed lines in FIG. 2 so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a hermetic seal between the base 130 and the cover 132. In some examples, the seal between the base 130 and the cover 132 is sufficiently strong to retain, over time, the environmental conditions within the interior cavity 114 at the time the housing 102 is sealed.

Figure 2:
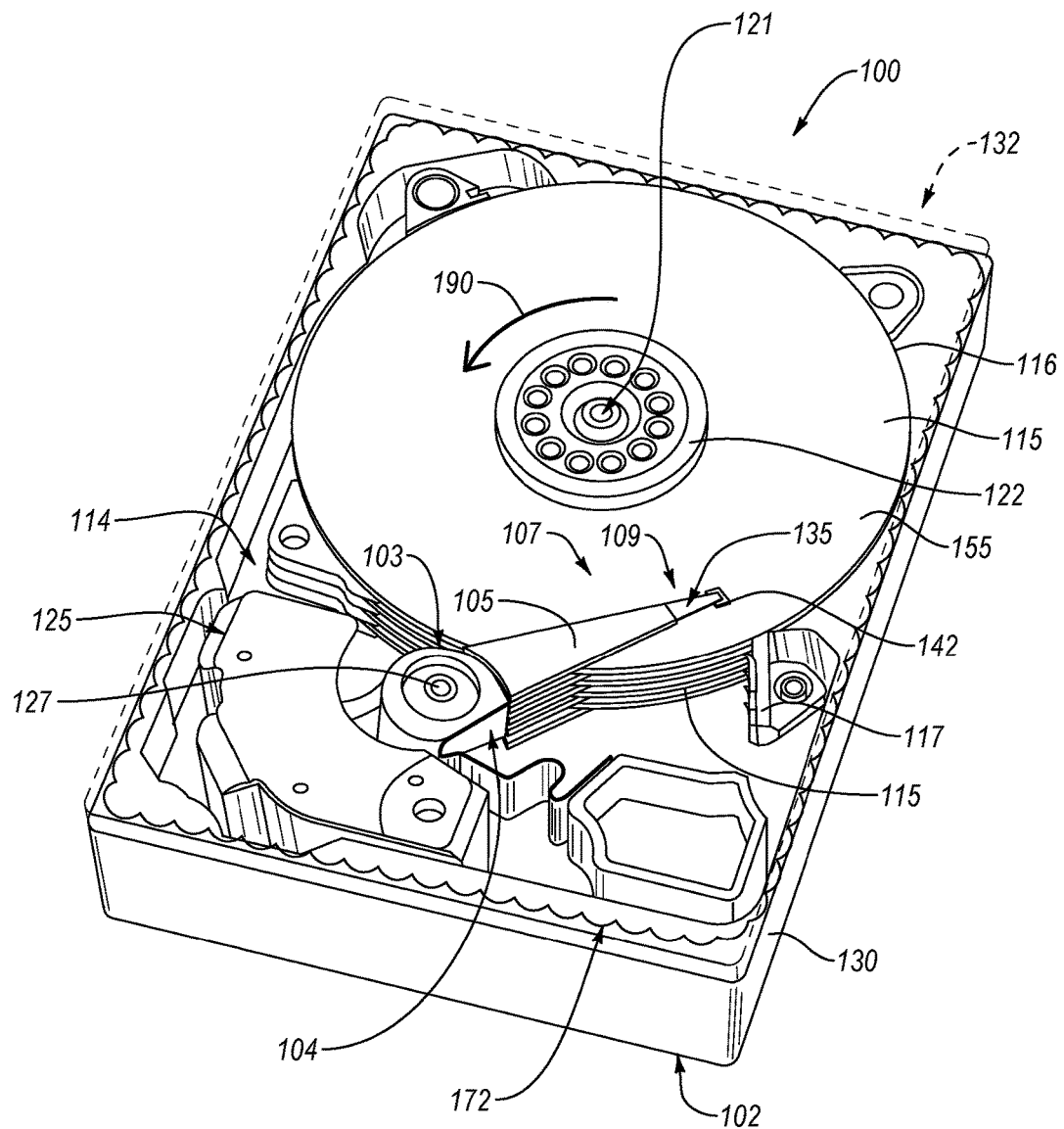
FIG. 2 is a perspective view of the magnetic storage device of FIG. 1, with a cover of a housing of the magnetic storage device hidden for convenience in showing internal features of the magnetic storage device, according to one or more examples of the present disclosure.

Referring to FIG. 2, the magnetic storage device 100 includes various features located within the interior cavity 114 of the housing 102. In some examples, the magnetic storage device 100 includes a carriage 103, disks 115, a spindle motor 121, and a voice coil motor (VCM) 125 within the interior cavity 114. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. In the illustrated example of FIG. 2, only one head-gimbal assembly 109 is shown coupled to the distal tip of each carriage arm 105 of the plurality of carriage arms 105. However, it is noted that each carriage arm 105 may have another head-gimbal assembly 109 on an opposite side of the carriage arm, which mirror the head-gimbal assembly 109 shown. Each head-gimbal assembly 109 includes a suspension assembly 135 and a slider 142.

Figure 3:
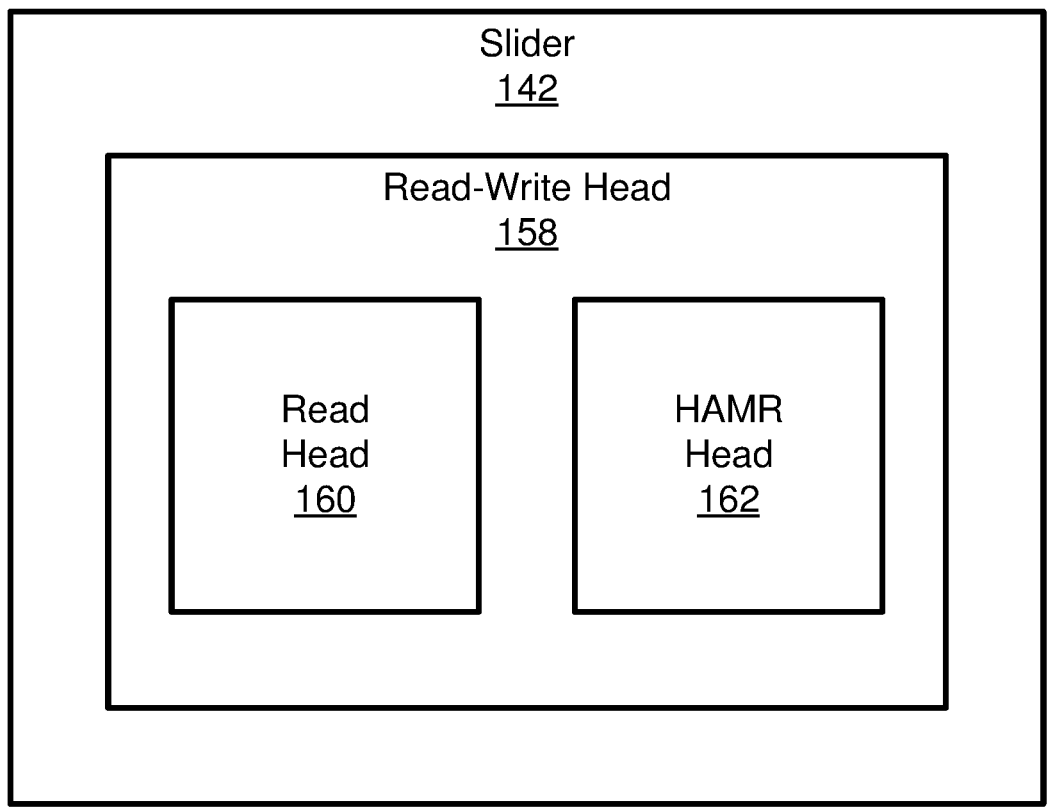
FIG. 3 is a schematic block diagram of a slider of a magnetic storage device, according to one or more examples of the present disclosure.
Figure 4:
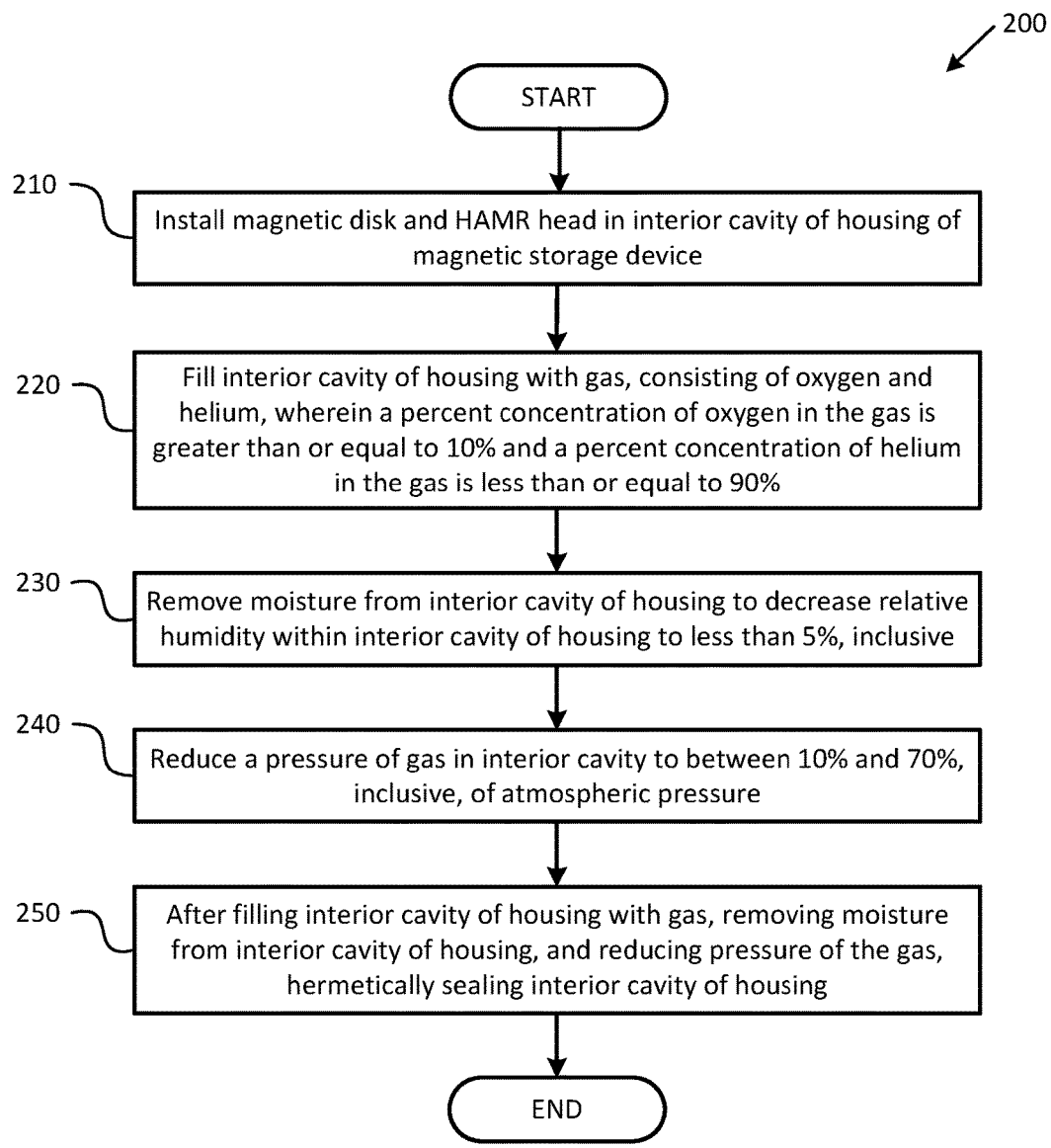
FIG. 4 is a schematic flow chart of a method of making a magnetic storage device, according to one or more examples of the present disclosure.

Referring to FIG. 3, the slider 142 includes at least one read-write head 158 coupled to (e.g., embedded in) the slider 142. The read-write head 158 includes a read head 160 (e.g., read portion) and a heat-assisted magnetic storage (HAMR) head 162 (e.g., write portion). The read head 160 includes at least one read transducer and the HAMR head 162 includes at least one near-field transducer. The read transducer is configured to detect magnetic properties (e.g., magnetic bit patterns) of a corresponding one of the disks 115 and convert the magnetic properties into an electrical signal. In contrast, the near-field transducer changes the magnetic properties of the corresponding one of the disks 115 responsive to an electrical signal. The near-field transducer of the HAMR head 162 is configured to temporarily heat a region of the disk 115 during writing to help facilitate the change in the magnetic properties at the heated region. Heating the region of the disk 115 during writing allows the magnetic properties at the heated region to be changed with a relatively smaller magnetic field, which in turn allows writing to much smaller regions and increases the data storage capacity of the disk 115. According to some examples, the heated region is on the scale of tens of nanometers and the region is heated less than one nanosecond. In one example, the near-field transducer of the HAMR head 162 includes a plurality of plasmonic nanostructures to deliver heat via a surface guided laser.

Although the magnetic storage device 100 in FIG. 1 is shown to have five carriage arms 105 and four disks 115, in other embodiments the magnetic storage device 100 can have fewer or more than five carriage arms 105 or fewer or more than four disks 115. In one embodiment, each side of each carriage arm 105 facing a disk 115 has a head-gimbal assembly 109 (e.g., each of bottom and top carriage arms 105 can have one head-gimbal assembly 109 and each of middle carriage arms 105, between the bottom and top carriage arms 105, can have two head-gimbal assemblies 109). Similarly, although the magnetic storage device 100 is shown to have one spindle motor 121 and one VCM 125, in other embodiments, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic storage media. Generally, in one embodiment, each disk 115 includes a substrate and a magnetic material applied directly or indirectly onto the substrate. For example, the magnetic material of the disks 115 may be conventional granular magnetic storage disks or wafers that have magnetic layer bits with multiple magnetic grains on each bit. In granular magnetic media, all of the bits are co-planar and the surface 116 of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body with) and extend away from a base of the carriage 103 in a spaced-apart manner relative to each other. In some implementations, each of the carriage arms 105 is spaced an equi-distance apart from and extend parallel relative to adjacent carriage arms 105. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 15, such that the head-gimbal assemblies 109 are parked or unloaded onto a ramp support 117 secured to the base 130.

For each head-gimbal assembly 109, the electrical signals are transmitted from and to the read-write head 158 of the slider 142 via electrical traces or lines formed in or coupled to the slider 142. The electrical traces of the slider 142 are electrically interconnected to facilitate transmission of electrical signals between the read-write head 158 and a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted.

The slider 142 of the head-gimbal assembly 109 is configured to support the read-write head 158 at a proper flying height above a read-write surface 155 of a corresponding one of the disks 115. Although not shown, the slider 142 may include an air bearing surface of side rails that glide along the read-write surface 155 as the disk 115 rotates relative to the head-gimbal assembly 109. Alternatively, the slider 142 may include an air bearing surface of complex shapes, which includes shallow and deep grooves, configured to predictably position the slider 142 above the read-write surface 155 of the disk 115. The slider 142 can be made of any of various materials, such as low friction materials. For example, in one implementation, the body of the slider 142 is made of ceramics, such as, for example, aluminum oxide titanium carbide ($Al_2O_3$—TiC). In some implementations, although not shown, the slider 142 may include a thermal flying-height control (TFC) actuator to adjust the flying height of the read-write head relative to the read-write surface 155.

To promote the efficient and reliable operation of the components within the interior cavity 114 of the magnetic storage device 100, a gas 172 (shown schematically) is introduced into the interior cavity 114 to create a gas-enriched atmosphere within the interior cavity 114. In one implementation, the gas 172 can include an inert gas with a density lower than air. For example, the gas 172 can include helium. In some examples, as presented below, the gas 172 consists of helium and oxygen. In other words, in some examples, the entirety of the gas 172 in the interior cavity 114 includes only helium and oxygen. As defined herein, in some examples, a gas including only helium and oxygen may include trace amounts (such as a percent composition of less than 0.1%) of other gaseous substances. In certain examples, as used herein, helium can be replaced with nitrogen or another inert gas.

Due to the harsh demands (e.g., intense heat) placed on the HAMR head 162 of the read-write head 158 during writing operations, among other considerations, the operational lifetime of the HAMR head 162, caused by degradation of the HAMR head 162 and surrounding structure, may be negatively impacted. Accordingly, the magnetic storage device 100 includes features that help slow degradation of and around the HAMR head 162, which promotes the operational lifetime of the HAMR head 162.

According to some examples, one feature of the magnetic storage device 100 that promotes the operational lifetime of the HAMR head 162 is a relatively high percent concentration of oxygen in the gas 172. In one example, the percent concentration of oxygen in the gas 172, consisting of only helium and oxygen, is equal to or greater than 3%. Correspondingly, in the same example, the percent concentration of helium in the gas 172 is equal to or less than 97%. In one example, the percent concentration of oxygen in the gas 172, consisting of only helium and oxygen, is equal to or greater than 10%. Correspondingly, in the same example, the percent concentration of helium in the gas 172 is equal to or less than 90%. Because the gas 172, consisting of only helium and oxygen, includes high concentrations of oxygen and helium, the magnetic storage device 100 provides both the benefits of expanded operational lifetime of the HAMR head 162 and efficient and reliable operation of other components of the magnetic storage device 100. It was found that percent concentrations of oxygen in the gas 172 less than the lower limits of the magnetic storage device 100 specified in the present disclosure did not provide enough benefit to the longevity of the HAMR head 162 and percent concentrations of helium in the gas 172 less than the lower limits of the magnetic storage device 100 specified in the present disclosure did not sufficiently promote efficient and reliable operation of the components within the interior cavity 114 of the magnetic storage device 100. According to an example, a percent concentration of oxygen in the gas 172, consisting of only helium and oxygen, of at least 10% increases the operational lifetime of the HAMR head 162 by approximately fifty times.

Higher percent concentrations of oxygen in the gas 172 above 10% can further prolong the operational lifetime of the HAMR head 162. For example, the percent concentration of oxygen in the gas 172, consisting of only helium and oxygen, can be between 20% and 30%, inclusive. In such an example, the percent concentration of helium in the gas 172, consisting of only helium and oxygen, can be between 70% and 80%, inclusive. In one implementation of the example, the percent concentration of oxygen in the gas 172 is greater than 20% and the percent concentration of helium in the gas 172 is less than 80%. As defined herein in the context of a numerical range, inclusive means a numerical range includes the outer-defined limits of the numerical range.

Although higher percent concentrations of oxygen in the gas 172 help prolong the operation lifetime of the HAMR head 162, higher percent concentrations of oxygen in the gas 172 may also result in an increase in track misregistration (TMR) and/or electrical power consumption. TMR and electrical power consumption is inversely related to the overall performance of the magnetic storage device 100. In other words, as TMR and electrical power consumption increases, the overall performance of the magnetic storage device 100 decreases and vice versa.

Inventors of the present disclosure discovered a feature of the magnetic storage device 100 that reduces TMR and electrical power consumption even with a higher percent concentration of oxygen in the gas 172. It was determined that the internal pressure of the gas 172 affects the TMR and electrical power consumption of the magnetic storage device 100. More specifically, at lower internal pressures of the gas 172, the TMR and electrical power consumption of the magnetic storage device 100 was reduced compared to higher internal pressures. In some examples, the internal pressure of the gas 172 is between 10% and 70%, inclusive, of atmospheric pressure (e.g., 101,325 Pascals or 14.6959 pounds per square inch). As defined herein, atmospheric pressure is the mean pressure exerted by the weight of the atmosphere at sea level. In certain examples, the internal pressure of the gas 172 is between 20% and 40%, inclusive, of atmospheric pressure. According to one specific example, the internal pressure of the gas 172 is 30% of atmospheric pressure. The air bearing surface of the slider 142 promotes stable flying of the slider 142 at such reduced internal pressures of the gas 172. Lowering the internal pressure of the gas 172 helps capture the benefits of higher percent concentrations of oxygen in the gas 172 without sacrificing the overall performance of the magnetic storage device 100. It was found that internal pressures of the gas 172 less than the lower limits of the magnetic storage device 100 specified in the present disclosure were not enough to provide efficient and reliable operation of the components within the interior cavity 114 of the magnetic storage device 100 and internal pressures of the gas 172 greater than the upper limits of the magnetic storage device 100 specified in the present disclosure did not sufficiently reduce TMR and electrical power consumption.

In addition to intense heat, the erosion of cladding on and around the HAMR head 162 during a write operation can decrease the operational lifetime of the HAMR head 162. During a write operation on a disk 115, erosion of the cladding on and around the HAMR head 162 may develop when a sufficient amount of water is present on the disk 115. Inventors of the present disclosure discovered a feature of the magnetic storage device 100 that reduces the erosion of the cladding and thus promotes the operational lifetime of the HAMR head 162. For example, in some implementations, the relative humidity within the interior cavity 114 of the housing 102 is less than 5%, inclusive. Reducing the relative humidity to less than 5%, inclusive, results in less water on the disk 115. Such a reduction in water on the disk 115 promotes a reduction in the formation of cladding erosion and thus an increase in the operational lifetime of the HAMR head 162. In certain examples, the relative humidity within the interior cavity 114 is less than 3% or less than 1%. These lower levels of relative humidity further inhibit the formation of cladding erosion and further prolong the operational lifetime of the HAMR head 162. It was found that relative humidity values less than the lower limits of the magnetic storage device 100 specified in the present disclosure were not high enough to ensure efficient and reliable operation of the components within the interior cavity 114 of the magnetic storage device 100 and relative humidity values greater than the upper limits of the magnetic storage device 100 specified in the present disclosure did not sufficiently reduce moisture buildup on the disks 115 to satisfactorily reduce cladding erosion on and around the HAMR head 162.

Smear, or material buildup, on or around the HAMR head 162 may also lead to a drop in the operational lifetime of the HAMR head 162. Inventors of the present disclosure discovered a feature of the magnetic storage device 100 that reduces smear or the buildup at the HAMR head 162. More specifically, smear can be inhibited by increasing the percent concentration of oxygen in the gas 172. Additional concentrations of oxygen help to more completely burn out smear at the HAMR head 162 during a writing operation.

As presented above, the percent concentration of oxygen in the gas 172, consisting of only helium and oxygen, can be equal to or greater than 3% and the percent concentration of helium in the gas 172 can be equal to or less than 97%. In one example, the percent concentration of oxygen in the gas 172, consisting of only helium and oxygen, is equal to or greater than 10% and the percent concentration of helium in the gas 172 can be equal to or less than 90%. In some examples, the percent concentration of oxygen in the gas 172, consisting of only helium and oxygen, can be between 20% and 30%, inclusive, and the percent concentration of helium in the gas 172 can be between 70% and 80%. In yet certain examples, the percent concentration of oxygen in the gas 172, consisting of only helium and oxygen, is greater than 20%, inclusive, and the percent concentration of helium in the gas 172 is less than 80%, inclusive. These higher concentrations of oxygen in the gas 172 reduce smear at the HAMR head 162 and thus increase the operation lifetime of the HAMR head 162. It was found that percent concentrations of oxygen in the gas 172 less than the lower limits of the magnetic storage device 100 specified in the present disclosure did not sufficiently reduce smear on or around the HAMR head 162 and percent concentrations of helium in the gas 172 less than the lower limits of the magnetic storage device 100 specified in the present disclosure did not sufficiently promote efficient and reliable operation of the components within the interior cavity 114 of the magnetic storage device 100.

In some examples, the magnetic storage device 100 includes all the above-presented features configured to improve the operational lifetime of the HAMR head 162. More specifically, the magnetic storage device 100 includes a higher percent concentration of oxygen in the gas 172, a lower relative humidity, and a lower pressure of the gas 172. However, in other examples, the magnetic storage device 100 includes less than all of the above-presented features configured to improve the operational lifetime of the HAMR head 162. For example, the magnetic storage device 100 may include a higher percent concentration of oxygen in the gas 172 and a lower relative humidity in the interior cavity 114, but does not include a lower pressure of the gas 172. Conversely, in certain examples, the magnetic storage device 100 may include a higher percent concentration of oxygen in the gas 172 and a lower pressure of the gas 172, but does not include a lower relative humidity in the interior cavity 114.

According to one example, a method 200 of making the magnetic storage device 100 includes installing one or more magnetic disks 115 and HAMR heads 162 in the interior cavity 114 of the housing 102 of the magnetic storage device 100 at 210. The method 200 also includes filling the interior cavity 114 of the housing 102 with the gas 172, which consists of oxygen and helium, at 220. A percent concentration of oxygen in the gas 172 is greater than or equal to 10% and a percent concentration of helium in the gas 172 is less than or equal to 90%. The method 200 additionally includes removing moisture from the interior cavity 114 of the housing 102 to decrease a relative humidity within the interior cavity 114 of the housing 102 to less than 5%, inclusive at 230. The method 200 further includes reducing a pressure of the gas 172 in the interior cavity 114 to between 10% and 70%, inclusive, of atmospheric pressure at step 240. After filling the interior cavity 114 of the housing 102 with the gas 172 at 220, removing moisture from the interior cavity 114 of the housing 102 at 230, and reducing the pressure of the gas 172 at 240, the method 200 includes hermetically sealing the interior cavity 114 of the housing 102 at 250.

In some implementations, removing moisture from the interior cavity 114 of the housing 102 at 230 is accomplished using a dehumidifier, such as a desiccant-type dehumidifier. According to an example, a desiccant-type dehumidifier purges humid gas 172 in the interior cavity 114 of the housing 102 by bringing the humid gas 172 into contact with a desiccant device, such as a rotor, that absorbs moisture in the gas 172. The desiccant device is heated at a location external to the interior cavity 114 to induce desorption of the moisture from the desiccant device. The desorbed moisture is evaporated or collected at a location external to the interior cavity 114. The humid gas 172 taken from the interior cavity 114 is replaced by clean dry gas 172.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
   a housing defining an interior cavity;
   at least one magnetic disk in the interior cavity of the housing;
   at least one read-write head in the interior cavity and configured to read data from and write data to the magnetic disk; and
   a gas, comprising oxygen, hermetically sealed in the interior cavity of the housing;
   wherein, during operational use:
      a percent concentration of oxygen in the gas is greater than or equal to 10%;
      a pressure of the gas is between 10% and 70%, inclusive, of atmospheric pressure; and
      a relative humidity within the interior cavity is less than 5%.

2. The magnetic storage device according to claim 1, wherein the percent concentration of oxygen in the gas is between 20% and 30%, inclusive.

3. The magnetic storage device according to claim 2, wherein the percent concentration of oxygen in the gas is greater than 20%.

4. The magnetic storage device according to claim 2, wherein the pressure of the gas is between 20% and 40%, inclusive, of atmospheric pressure.

5. The magnetic storage device according to claim 1, wherein the read-write head comprises a heat-assisted magnetic storage (HAMR) head.

6. The magnetic storage device according to claim 1, wherein:
   the gas consists of oxygen and helium; and
   a percent concentration of helium in the gas is less than or equal to 90%.

7. The magnetic storage device according to claim 6, wherein:
   the percent concentration of oxygen in the gas is between 20% and 30%, inclusive; and
   the percent concentration of helium in the gas is between 70% and 80%.

8. The magnetic storage device according to claim 1, wherein the relative humidity within the interior cavity is less than 1%, inclusive.

9. A magnetic storage device, comprising:
a housing defining an interior cavity;
at least one magnetic disk in the interior cavity of the housing;
at least one read-write head in the interior cavity and configured to read data from and write data to the magnetic disk; and
a gas, comprising oxygen, hermetically sealed in the interior cavity of the housing;
wherein, during operational use:
a percent concentration of oxygen in the gas is greater than or equal to 3%; and
a relative humidity within the interior cavity is less than 5%.

10. The magnetic storage device according to claim 9, wherein the relative humidity within the interior cavity is less than 1%, inclusive.

11. The magnetic storage device according to claim 9, wherein the percent concentration of oxygen in the gas is greater than 10%, inclusive.

12. The magnetic storage device according to claim 11, wherein the percent concentration of oxygen in the gas is between 20% and 30%, inclusive.

13. The magnetic storage device according to claim 9, wherein the read-write head comprises a heat-assisted magnetic storage (HAMR) head.

14. The magnetic storage device according to claim 9, wherein:
the gas comprises helium and oxygen; and
a percent concentration of helium in the gas is less than or equal to 90%.

15. A magnetic storage device, comprising:
a housing defining an interior cavity;
at least one magnetic disk in the interior cavity of the housing;
at least one read-write head in the interior cavity and configured to read data from and write data to the magnetic disk, wherein the read-write head comprises a heat-assisted magnetic storage (HAMR) head; and
a gas, comprising oxygen and helium, hermetically sealed in the interior cavity of the housing;
wherein, during operational use:
a percent concentration of oxygen in the gas is greater than or equal to 3%;
a pressure of the gas is between 10% and 70%, inclusive, of atmospheric pressure;
a relative humidity within the interior cavity is less than 5%; and
a percent concentration of helium in the gas is less than or equal to 90%.

16. The magnetic storage device according to claim 15, wherein:
the percent concentration of oxygen in the gas is between 20% and 30%, inclusive;
the pressure of the gas is between 20% and 40%, inclusive, of atmospheric pressure;
the percent concentration of helium in the gas is between 70% and 80%, inclusive; and
the relative humidity within the interior cavity is less than 1%, inclusive.

17. The magnetic storage device according to claim 16, wherein the percent concentration of oxygen in the gas is greater than 20%.

* * * * *